(12) United States Patent
Zhou

(10) Patent No.: US 12,492,712 B1
(45) Date of Patent: Dec. 9, 2025

(54) WAIST HANGING FAN

(71) Applicant: Zhenyu Zhou, Neijiang (CN)

(72) Inventor: Zhenyu Zhou, Neijiang (CN)

( * ) Notice: Subject to any disclaimer, the term of this patent is extended or adjusted under 35 U.S.C. 154(b) by 0 days.

(21) Appl. No.: 19/182,269

(22) Filed: Apr. 17, 2025

(30) Foreign Application Priority Data

Jan. 13, 2025 (CN) .......................... 202520064536.3

(51) Int. Cl.
*F04D 29/56* (2006.01)
*F04D 19/00* (2006.01)
*F04D 25/08* (2006.01)

(52) U.S. Cl.
CPC .......... *F04D 29/563* (2013.01); *F04D 19/002* (2013.01); *F04D 25/08* (2013.01)

(58) Field of Classification Search
CPC ....... F04D 29/563; F04D 19/002; F04D 25/10
See application file for complete search history.

(56) References Cited

U.S. PATENT DOCUMENTS

D1,095,809 S  *  9/2025  Yan ............................. D23/380
12,421,971 B1 *  9/2025  Ouyang .................... A45F 5/02

\* cited by examiner

*Primary Examiner* — Brian O Peters
(74) *Attorney, Agent, or Firm* — Birchwood IP

(57) ABSTRACT

A waist hanging fan is provided, which includes an outer shell and a blowing component. The blowing component includes an inner wind duct shell, two ends of the inner wind duct shell are provided with an air inlet end and an air outlet end; an air blower provided in the inner wind duct shell; and a wind guide cover. The wind guide cover is circular. A lower end of the wind guide cover is provided in the outer shell and is sleeved on an outer side of the inner wind duct shell. An outer wall of the lower end of the wind guide cover is provided with a clamping protrusion, a wall of the outer shell or inner wind duct shell is provided with at least two clamping grooves. The present disclosure has the advantage that it is easier for wind to blow onto a user's body.

10 Claims, 10 Drawing Sheets

WAIST HANGING FAN

CROSS-REFERENCE TO RELATED APPLICATIONS

This application claims priority to Chinese Patent Application No. 202520064536.3, filed on Jan. 13, 2025, which is hereby incorporated by reference in its entirety.

TECHNICAL FIELD

The present disclosure relates to the field of fan technologies, and in particular, to a waist hanging fan.

BACKGROUND

Waist hanging fans are widely praised for their portability and practicality among people who need to move frequently or work in high-temperature environments. The fans are exquisitely designed and specially equipped with flexible hooks, allowing users to easily hang them on waistband, belt, or clothing. It is not only stable but also easy to carry, thereby greatly meeting the needs of users in different scenarios, so that users can always blow wind during activities.

However, the above-mentioned waist hanging fan has limited air ducts due to appearance requirements, which cannot meet the required air outlet requirements. At the same time, the air ducts cannot be tilted, which causes it difficult to blow to the uses' body parts, having poor fan experience.

SUMMARY

To address the shortcomings of existing technology, a waist hanging fan is provided that can make it easier for wind to blow onto user's body.

The present disclosure adopts the following technical solution for implementation: a waist hanging fan, including an outer shell and a blowing component, a side wall of the outer shell is provided with hooks, and the blowing component includes:

an inner wind duct shell, which is provided in the outer shell, and two ends of the inner wind duct shell are provided with an air inlet end and an air outlet end that are connected to an outside;

an air blower, which is provided in the inner wind duct shell, and a wind guide cover, which is provided at the air outlet end through two rotating shafts, a cross-sectional shape of a circumferential inner edge of the wind guide cover is circular, a lower end of the wind guide cover is provided in the outer shell and is sleeved on an outer side of the inner wind duct shell; an outer wall of the lower end of the wind guide cover is provided with a clamping protrusion, and at least two clamping grooves are provided on a wall of the outer shell or inner wind duct shell; the clamping grooves are arranged to be spaced apart on a rotation path of the wind guide cover, and the clamping protrusion is capable of matching one of the clamping grooves.

When in use, a user hangs the waist hanging fan on the user's waist belt, belt, or clothing through hooks, and a switch is started, and the air blower is rotated to achieve the fan's air output. At this time, if the user wants to change the blowing angle of the fan, the user can toggle the wind guide cover to cause the wind guide cover to be rotated around the rotation shafts. When rotating, the clamping protrusion will be clamped into a certain clamping groove. At this time, the blowing angle of the wind guide cover is fixed, and the blowing direction is a fixed direction.

Where, the two rotating shafts are radially symmetrical and can be provided on the inner wall or outer wall of the wind guide cover, it can be provided on the inner wall of the outer shell, or the outer wall of the inner wind duct shell. And a connecting line between the two rotating shafts passes through a central axis of the wind guide cover, and a direction of the connecting line is horizontal.

In this implementation mode, by providing a rotatable wind guide cover at the air outlet end, so that the blown air has a tilted angle and can better blow onto the user's body; at the same time, due to frequent movement of outdoor work users, this solution can fix an adjusted angle of the wind guide cover through a combination of a snap fit of the clamping protrusion and clamping grooves, avoiding a random rotation of the wind guide cover during movement and causing the air outlet to deviate from a required blowing angle.

In some embodiments of the present disclosure, a limit position table-board is provided on an inner wall of the wind guide cover, and the limit position table-board abuts against an end face of the air outlet end so as to limit a limit position of a rotation of the wind guide cover.

By providing the limit position table-board, an excessive rotation of the wind guide cover can be avoided. When it reaches the limit position, the limit position table-board will abut against the end face of the air outlet end, the end face of the air outlet end is also an end face of the inner wind duct shell.

In some embodiments of the present disclosure, positions of the hooks on the outer shell are perpendicular to the connecting line of the two rotating shafts; the limit position table-board includes a first table-board that is close to the hooks and a second table-board that is away from the hooks, there is an angle between the first table-board and the second table-board; when the first table-board abuts against an end face of the air outlet end, the wind guide cover is faced vertically; when the second table-board abuts against an end face of the air outlet end, the wind guide cover is tilted towards the hooks.

When the waist hanging fan is hung on the waist through hooks, the air outlet direction of the wind guide cover is mostly aimed at the stomach or back for outdoor workers. Therefore, considering practicality, as long as the wind guide cover can face the stomach or back of the human body when the waist hanging fan is hung on the waist, it is sufficient. Therefore, through the above scheme, the limit position that the wind guide cover can rotate is a vertical direction and an incline direction that is towards one side of the hooks.

In some embodiments of the present disclosure, the air outlet end of the inner wind duct shell is provided with an annular groove having an upward opening, the wind guide cover is adapted into the annular groove, one side of the wind guide cover that is away from the hooks is provided with a contact section that is extended downward; when the wind guide cover is faced vertically, a lower end of the contact section abuts against a groove bottom of the annular groove; when the wind guide cover is tilted towards the hooks, a lower end of one side of the wind guide cover that is close to the hooks abuts against the groove bottom of the annular groove.

Due to the fact that the limit position of the wind guide cover is a direction facing vertically and a direction towards the hooks, there is contact section that is downwardly extended on the side of the wind guide cover that is away from the hooks so as to meet the requirement that the limit position of the wind guide cover is facing vertically. At the same time, the wind guide cover does not have a contact section on the side of the wind guide cover that is close to the hooks, but directly abuts against the side close to the hooks through the wind guide cover, so that the wind guide cover has space to rotate towards the hooks, and the annular groove on the hooks side does not need to be further deepened, rendering the structure simpler and more compact.

In some embodiments of the present disclosure, an outer wall of the contact section is provided with the clamping protrusion.

Due to the fact that the contact section is an extended section of the wind guide cover, thereby providing the clamping protrusion on the contact section can make the structure more compact.

In some embodiments of the present disclosure, a clamping groove of the outer shell is provided at one side that is away from the hooks, and there are two clamping grooves, namely, a vertical clamping groove and an inclined clamping groove, and the vertical clamping groove is provided below the inclined clamping groove.

The two clamping grooves are provided to allow the wind guide cover to face vertically and tilt towards the direction of the hooks.

In some embodiments of the present disclosure, two ends of the inner wind duct shell respectively includes an upper inner wind duct shell and a lower inner wind duct shell, an inner diameter of the upper inner wind duct shell is gradually decreased from bottom to top, the lower inner wind duct shell includes an air inlet section with the air inlet end and an air blower section with the air blower, the air inlet section is provided at a lower end of the air blower section, an inner diameter of the air inlet section is gradually decreased from bottom to top, an inner diameter of the air blower section is gradually increased from bottom to top.

The inner diameter of the inlet section is gradually decreased from bottom to top, rendering an opening at the bottom of the air inlet section to be larger for air intake. At the same time, the inner diameter of the air blower section is gradually increased from bottom to top, rendering a connection between the air blower section and the air inlet section to be bent, which can achieve the effect of air flow concentration and radial pressurization, rendering the internal flow field smooth and providing sufficient air pressure and volume, thereby improving the operating efficiency of the fan. At the same time, the inner diameter of the upper inner wind duct shell is gradually decreased from bottom to top to enhance wind speed and render the wind stronger.

In some embodiments of the present disclosure, the inner wind duct shell further includes a middle inner wind duct shell provided between the upper inner wind duct shell and the lower inner wind duct shell, the middle inner wind duct shell is annular, and upper and lower ends of the middle inner wind duct shell are respectively connected to the upper inner wind duct shell and the lower inner wind duct shell; a fixing frame configured to fix the air blower is provided in the middle inner wind duct shell.

In some embodiments of the present disclosure, the hooks include a waist hanging hook and a cloth hanging hook that are arranged on two opposite sides of the outer shell, hanging directions of the waist hanging hook and cloth hanging hook are opposite, the wind guide cover is tilted towards the waist hanging hook and is not tilted towards the cloth hanging hook.

The hanging direction of the waist hook is opposite to the hanging direction of cloth hanging hook, which allows the fan to be hung on clothes or belts according to different needs. Different hook positions result in different directions of the air outlet. At the same time, the wind guide cover can tilt towards the waist hook side because the waist hook is a main hook used, and most of them are hung on the waist hook, so as to meet the wind blowing towards the human body.

In some embodiments of the present disclosure, the hooks are provided with support feet, and the support feet are rotatably connected to the hooks.

By providing the support feet, the hooks can be supported so as to support the entire fan, allowing the users to place the entire fan on the desktop when resting or not hanging the fan on their waist. The support feet have a tilted angle to support the fan, rendering it easy to blow the wind onto the user's face.

Compared with the existing technology, the present disclosure has a rotatable-board wind guide cover provided at the air outlet end, which makes the blown air have an inclined angle and can better blow onto the user's body. At the same time, due to the frequent movement of outdoor work users, this solution can fix the adjusted angle of the wind guide cover through a combination of a snap fit of the clamping protrusion and the clamping groove, thereby avoiding an advantage of a random rotation of the wind guide cover during the movement of the user, which may cause the air outlet to deviate from a required blowing angle.

NUMERAL REFERENCE

1—outer shell; 11—waist hanging hook; 111—support feet; 12—cloth hanging hook; 13—battery; 14—circuit board; 2—inner wind duct shell; 21—upper inner wind duct shell; 211—rotating shaft hole; 22—middle inner wind duct shell; 23—lower inner wind duct shell; 231—air blower section; 232—air inlet section; 3—wind guide cover; 31—contact section; 32—clamping protrusion; 33—rotating shaft; 4—fixing frame; 5—air blower; 51—motor; 52—fan blade; 61—first table-board; 62—second table-board; 71—vertical clamping groove; 72. inclined clamping groove; 8—annular groove.

DESCRIPTION OF EMBODIMENTS

Below is a further description of the present disclosure based on the accompanying drawings and specific embodiments.

Figure 1:
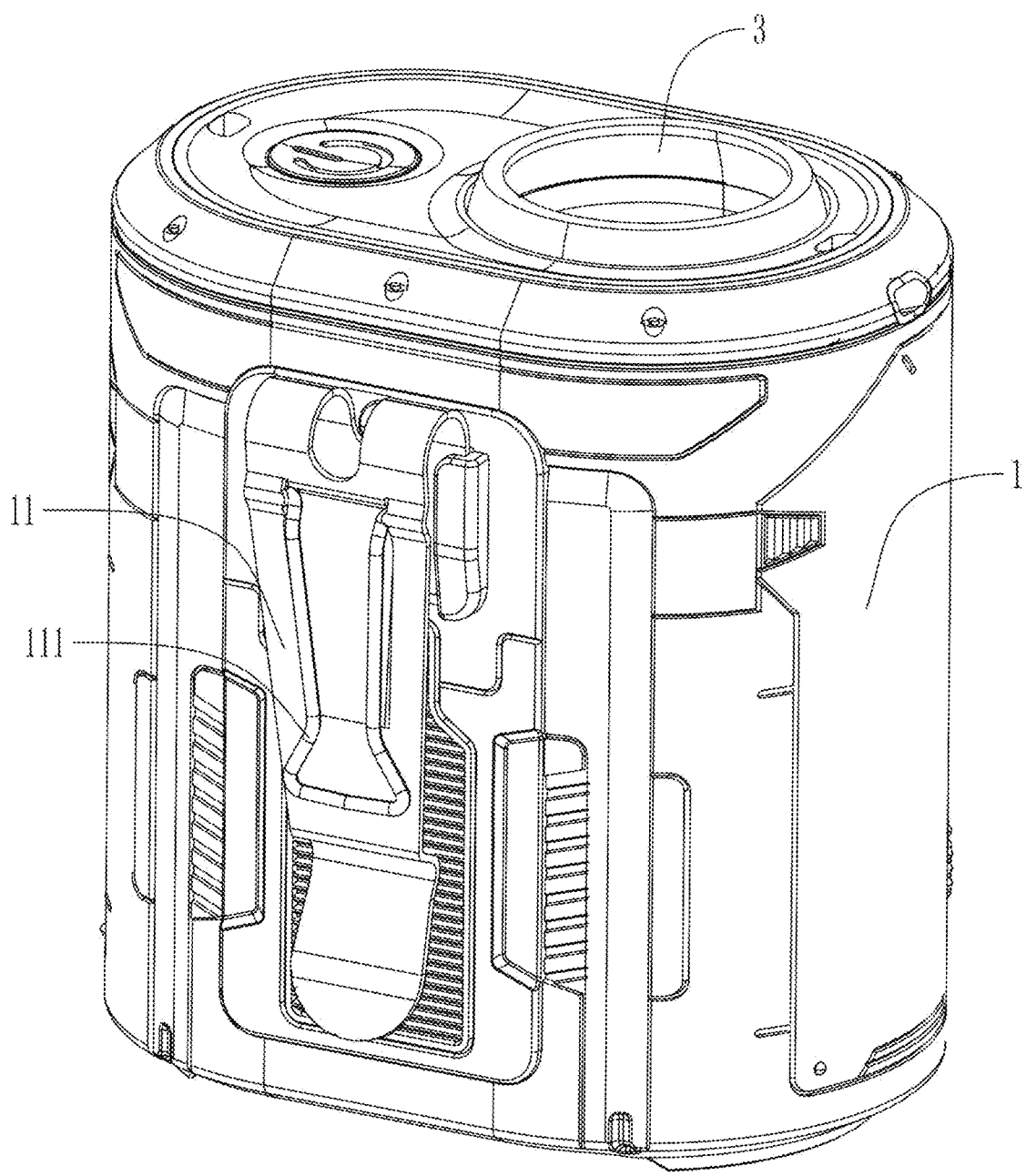
FIG. 1 is a schematic structural diagram of a wind guide cover of the present disclosure in a vertical state.
Figure 2:
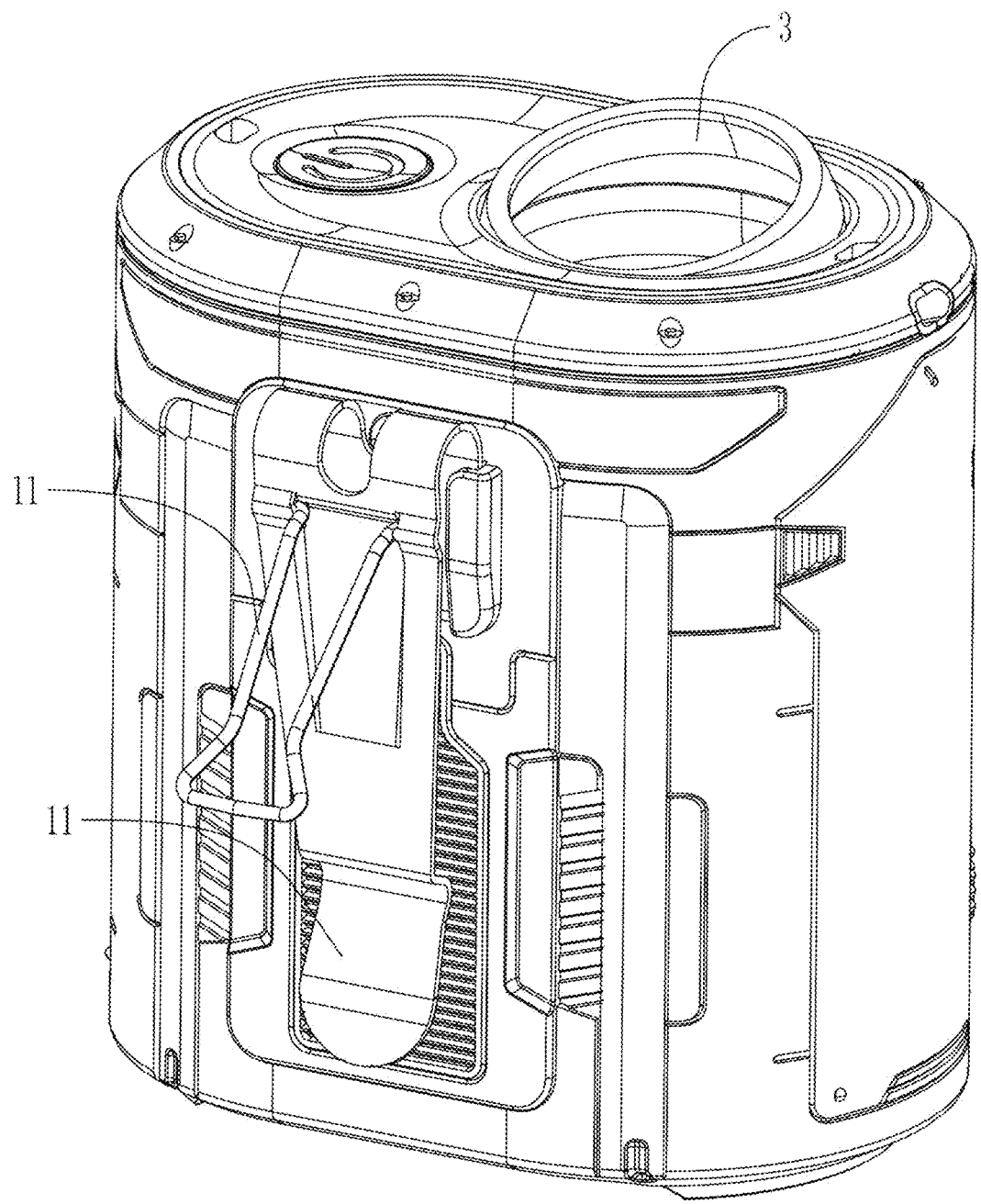
FIG. 2 is a schematic structural diagram of the wind guide cover in an inclined state.
Figure 3:
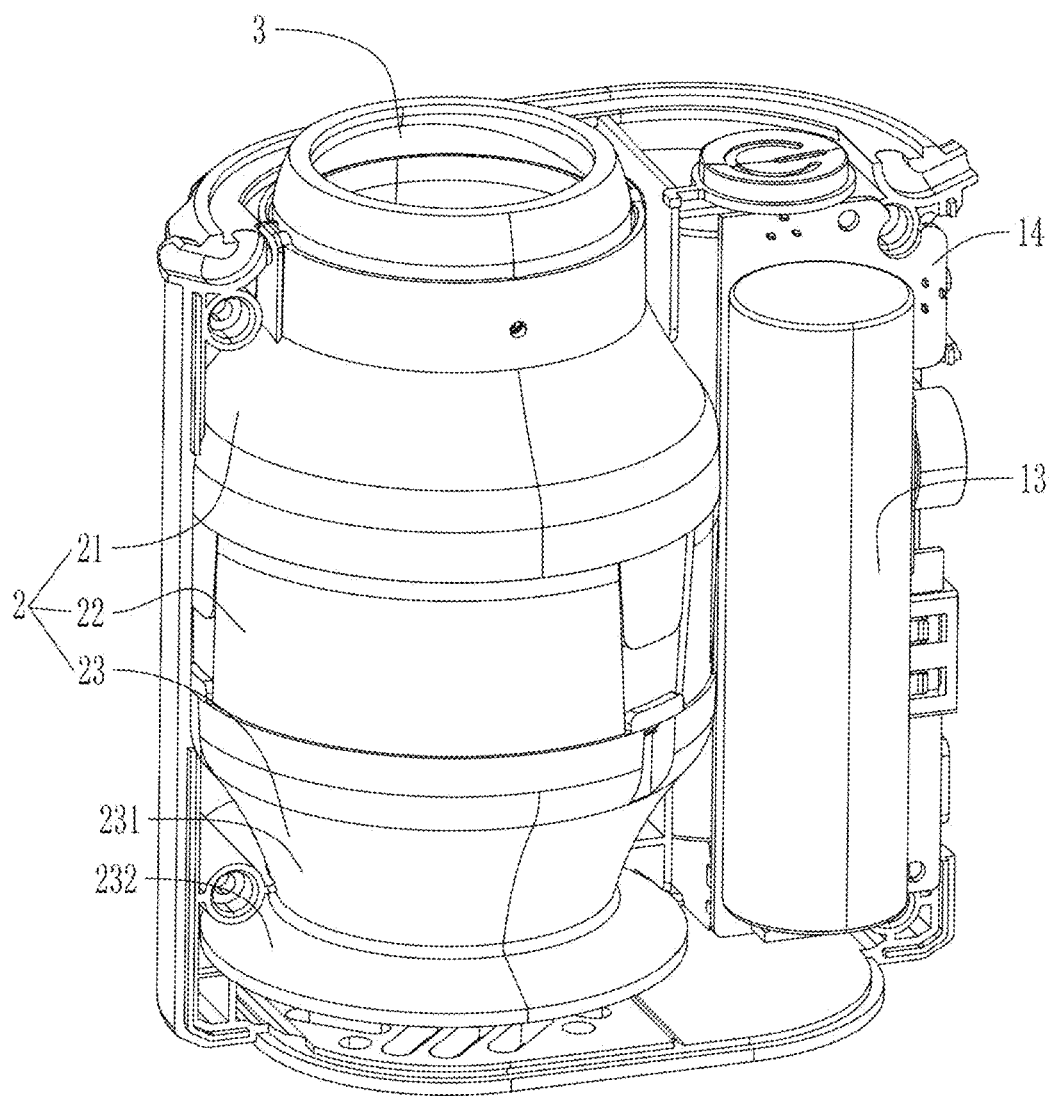
FIG. 3 is a schematic structural diagram of an interior of an outer shell.
Figure 4:
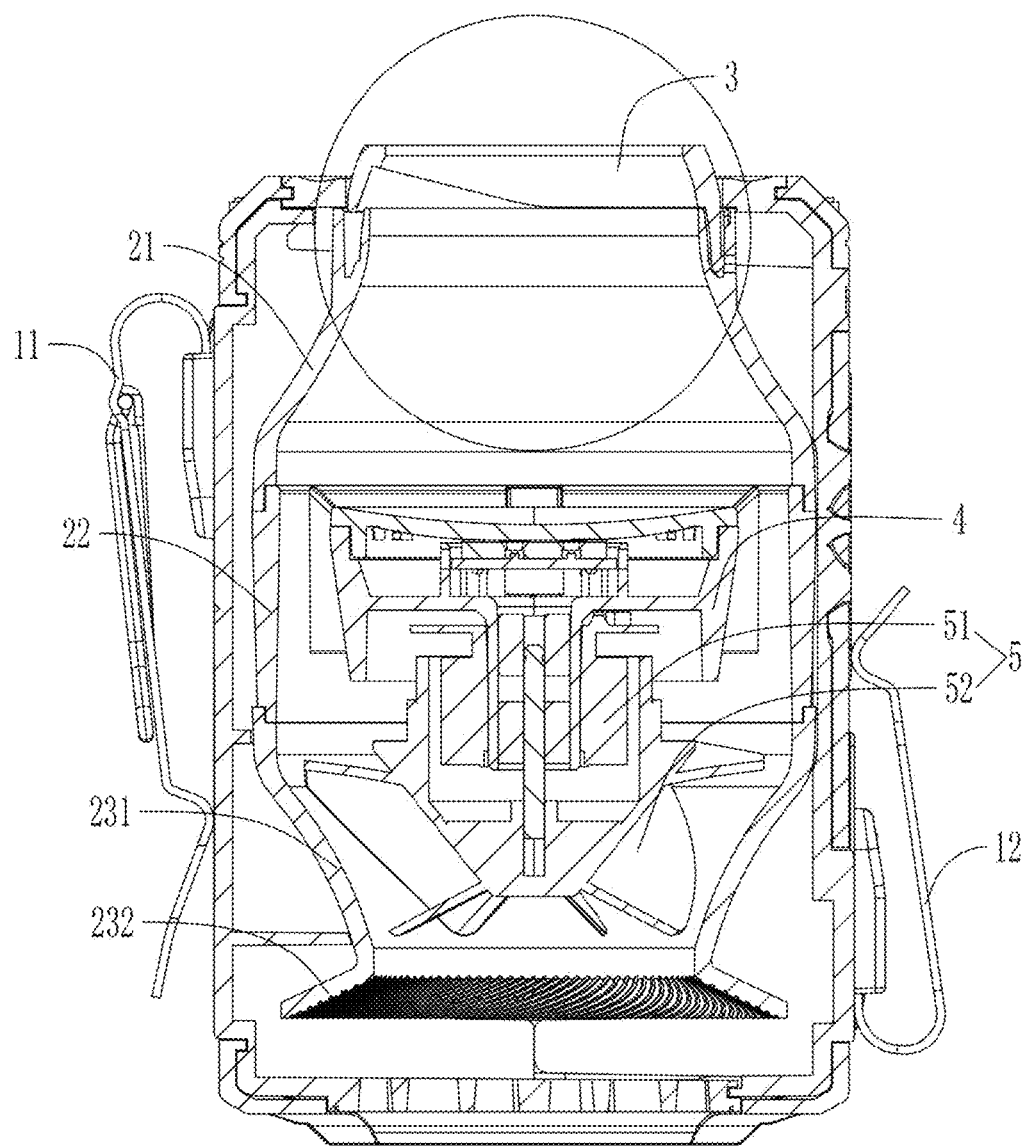
FIG. 4 is a sectional view of FIG. 1.
Figure 5:
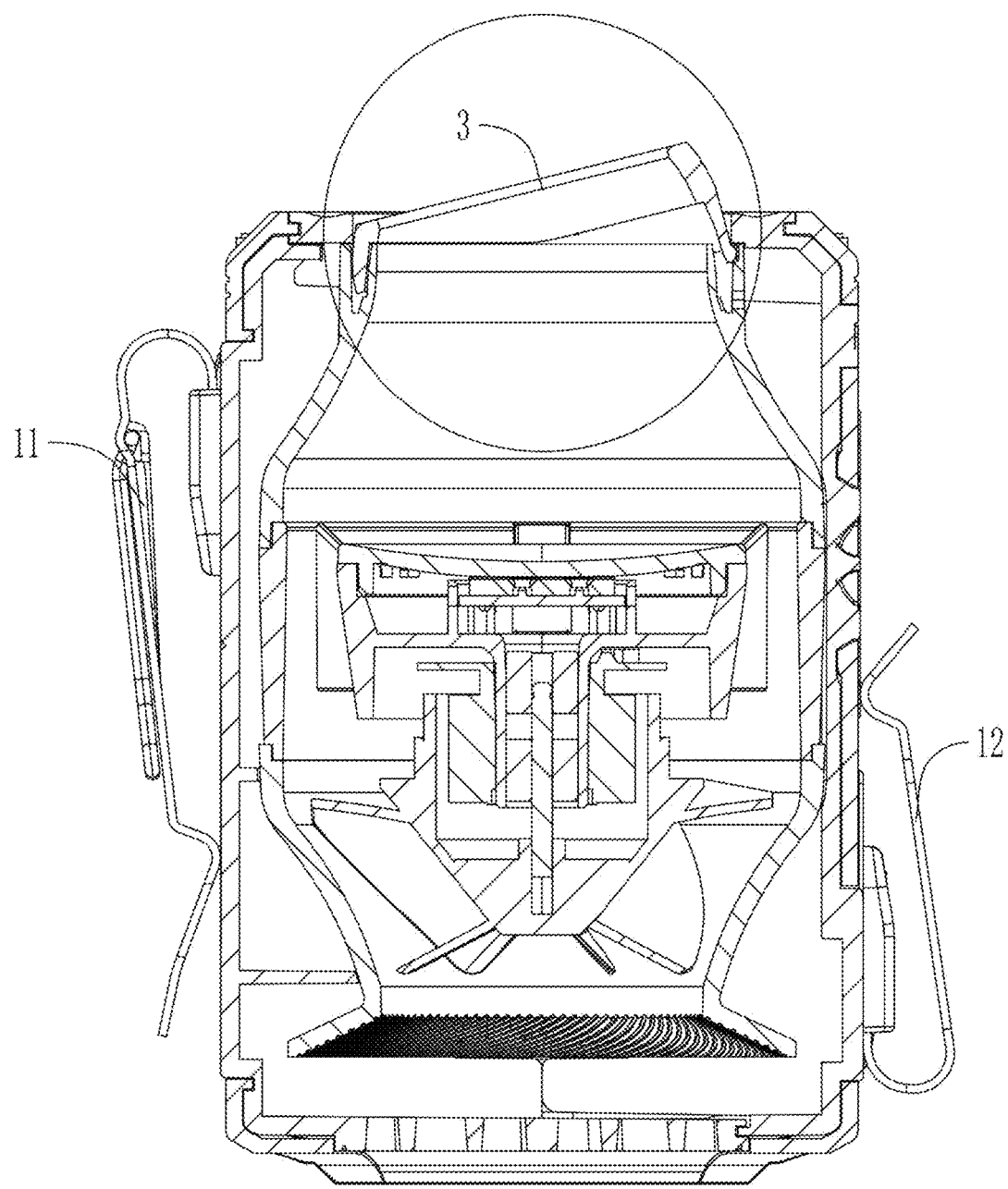
FIG. 5 is a sectional view of FIG. 2.
Figure 6:
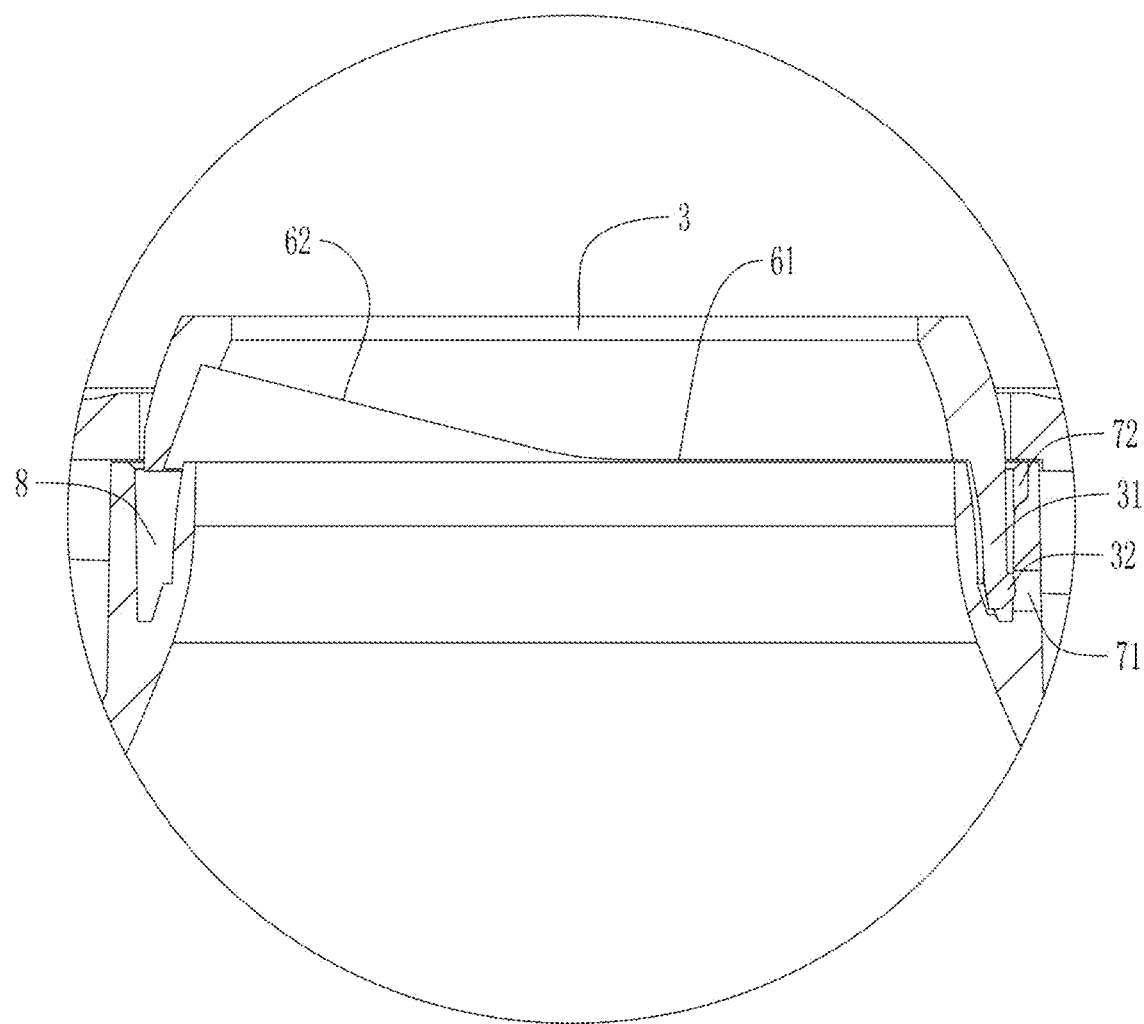
FIG. 6 is an enlarged view of a circled area in FIG. 4.
Figure 7:
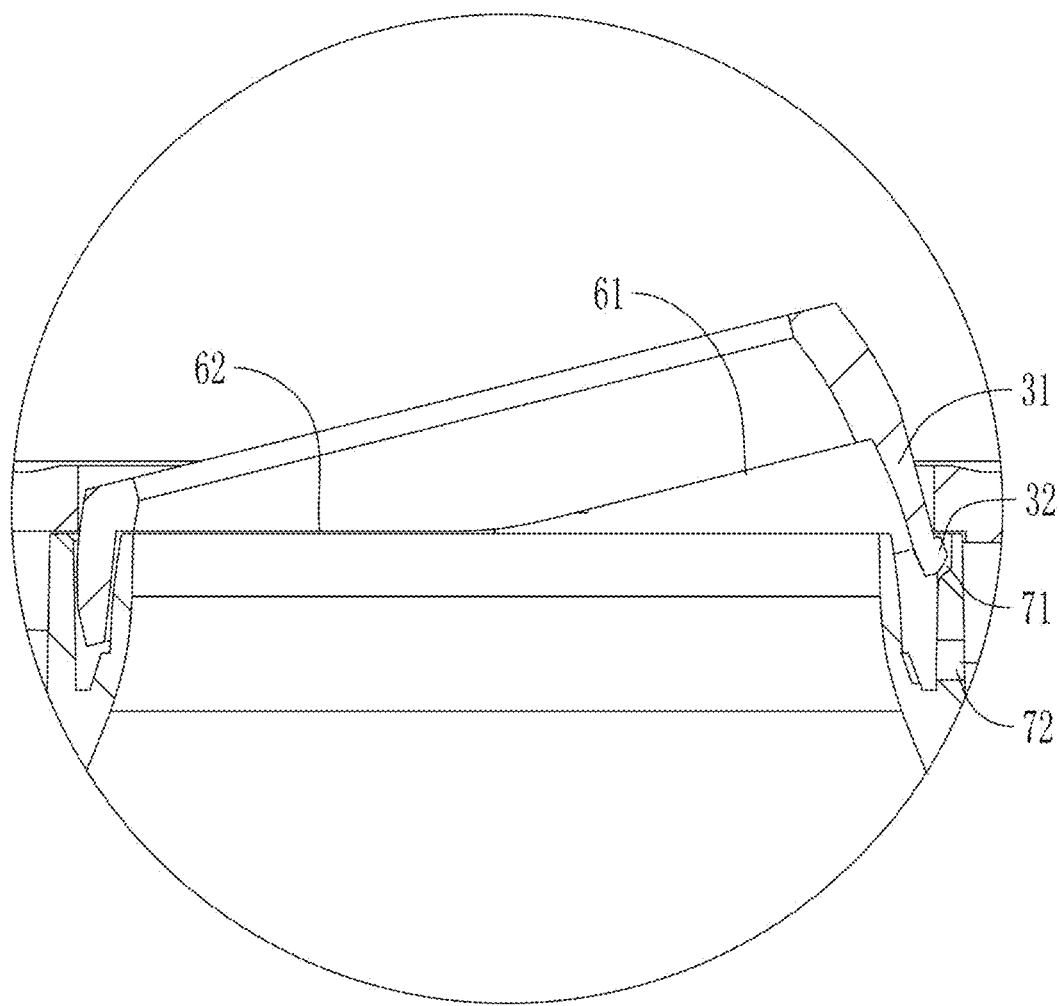
FIG. 7 is an enlarged view of a circled area in FIG. 5.
Figure 8:
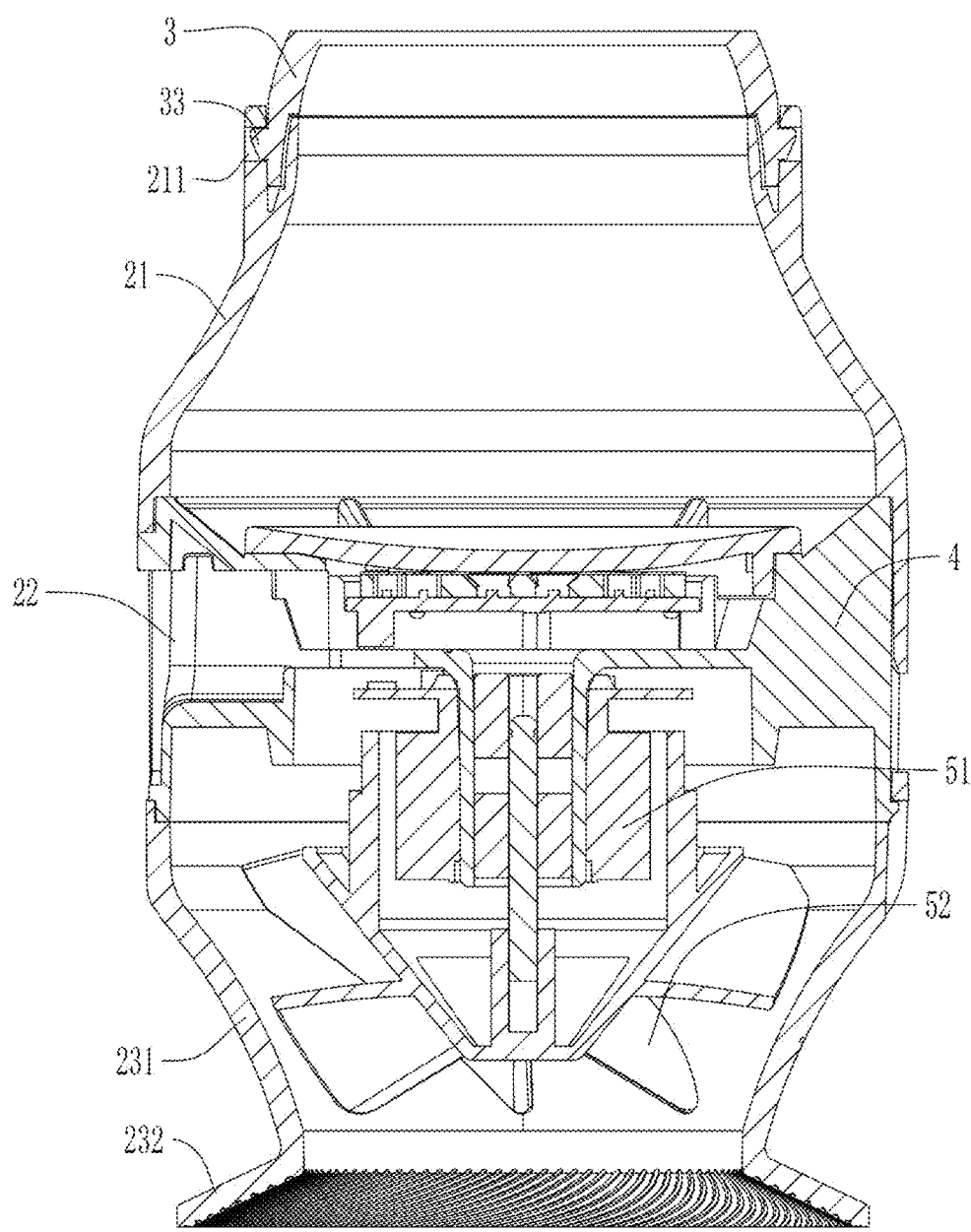
FIG. 8 is a sectional view of an inner wind duct shell.
Figure 9:
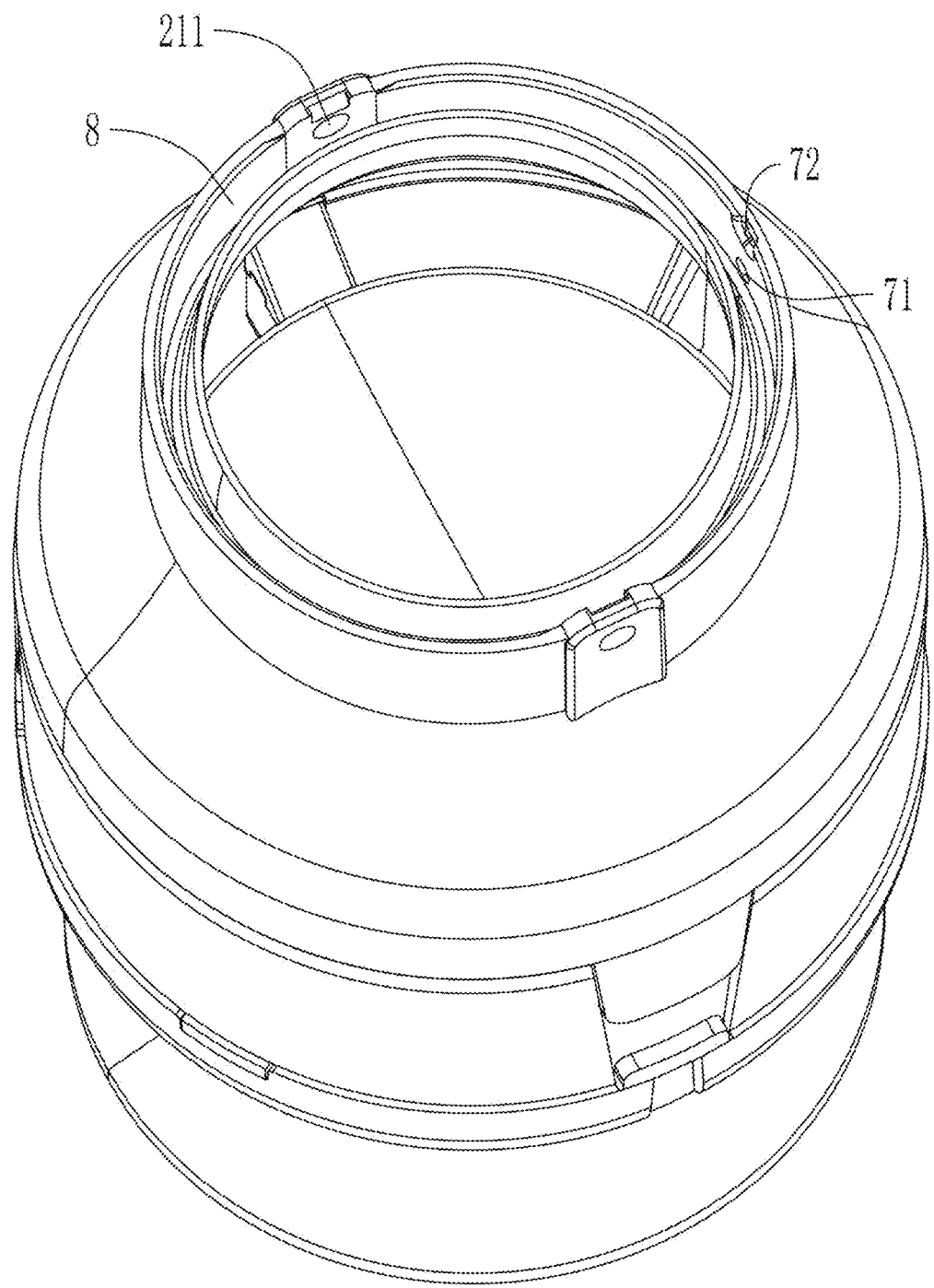
FIG. 9 is a schematic structural diagram of an air outlet end of the inner wind duct shell.
Figure 10:
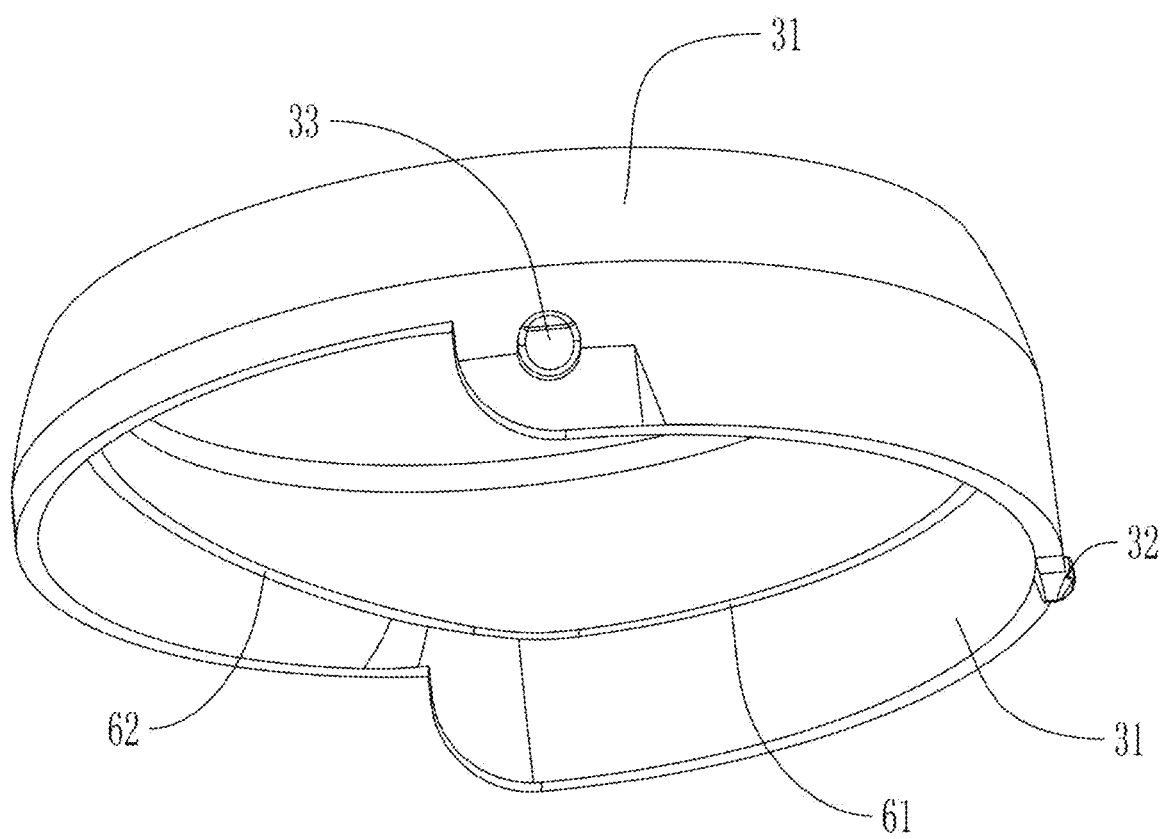
FIG. 10 is a schematic structural diagram of the wind guide cover.

As shown in FIGS. 1 to 3, an embodiment discloses a waist hanging fan, which includes an outer shell 1. The entire outer shell 1 is cylindrical in shape, an upper end of the outer shell 1 is an air outlet, and a lower end of the outer shell 1 is an air inlet. There are hooks on two opposite sides of the outer shell 1. The outer shell 1 is provided with an inner wind duct shell 2, and the inner wind duct shell 2 is extended in an up-down direction of the outer shell 1. An upper end of the inner wind duct shell 2 is an air outlet end, and a lower end thereof is an air inlet end. The air outlet end and the air inlet end are respectively connected to an outside through the air outlet and air inlet of the outer shell 1. There are a battery 13 and a circuit board 14 provided on one side of the inner wind duct shell 2 inside the outer shell 1.

As shown in FIGS. 3 to 5 and 8, the inner wind duct shell 2 includes an upper inner wind duct shell 21, a middle inner wind duct shell 22, and a lower inner wind duct shell 23 in sequence from top to bottom. The middle inner wind duct shell 22 is connected to the upper inner wind duct shell 21 and the lower inner wind duct shell 23 respectively. An upper end of the upper inner wind duct shell 21 is rotatably connected to a wind guide cover 3. There is a fixing frame 4 inside the middle inner wind duct shell 22, and the fixing frame 4 is fixedly provided with an air blower 5. The air blower 5 includes a motor 51 and fan blades 52. The air blower 5 is provided in the lower inner wind duct shell 23.

The upper inner wind duct shell 21 is gradually decreased from bottom to top, and an inner diameter of the middle inner wind duct shell 22 is the same and identical to maximum inner diameters of the upper inner wind duct shell 21 and the lower inner wind duct shell 23, respectively. The lower inner wind duct shell 23 includes an air inlet section 232 with the air inlet end and an air blower section 231 with the air blower 5. The air inlet section 232 is provided at a lower end of the air blower section 231, and an inner diameter of the air inlet section 232 is gradually decreased from bottom to top. An inner diameter of the air blower section 231 is gradually increased from bottom to top, so that a connection between the air blower section 231 and the air inlet section 232 is inwardly recessed.

As shown in FIGS. 4 to 10, an outer wall of the upper inner wind duct shell 21 has inner and outer sides, and an annular groove 8 having an upward opening is formed between inner and outer walls of the two layers. A groove wall of the annular groove 8 is provided with two rotating shaft holes 211 that are radially symmetrically arranged. An outer wall of the wind guide cover 3 is provided with two rotating shafts 33 that are extended into the rotating shaft hole 211 so as to allow the wind guide cover 3 to rotatably connect to the air outlet end of the inner wind duct shell 2.

The hooks include a waist hanging hook 11 and a cloth hanging hook 12. Hanging directions of the waist hanging hook 11 and the cloth hanging hook 12 are opposite. Both waist hanging hook 11 and the cloth hanging hook 12 are made of elastic and deformable plastic or iron parts, which can clamp to belts, pants straps, collars and other parts. A cross-sectional shape of a circumferential inner edge of the wind guide cover 3 is circular, and a connecting line of the two rotating shafts 33 of the wind guide cover 3 is perpendicular to a connecting line of the waist hanging hook 11 and the cloth hanging hook 12. A rotation path of the wind guide cover 3 is provided between the waist hanging hook 11 and the cloth hanging hook 12. On the waist hanging hook 11, there is a support foot 111 that can be rotated to open and close.

An inner wall of the wind guide cover 3 is provided with a limit position table-board, and the limit position table-board includes a first table-board 61 that is close to the cloth hanging hook 12 and a second table-board 62 that is close to the waist hanging hook 11. There is an angle between the first table-board 61 and the second table-board 62. A rotational limit position of the wind guide cover 3 is a vertical direction and an incline direction towards the waist hanging hook 11. When the first table-board 61 abuts against to an end face of the air outlet end, the wind guide cover 3 is faced vertically. When the second table-board 62 abuts against an end face of the air outlet end, the wind guide cover 3 is tilted towards the waist hanging hook 11.

One side of the wind guide cover 3 that is close to the cloth hanging hook 12 is provided with a contact section 31 that is downwardly extended. The contact section 31 is arc-shaped and a curvature matches an overall arc shape of the wind guide cover 3. When the wind guide cover 3 is faced vertically, a lower end of the contact section 31 abuts against a groove bottom of the annular groove 8. One end of the wind guide cover 3 that is close to the waist hanging hook 11 does not have the contact section 31, so when the wind guide cover 3 is tilted towards the waist hanging hook 11, a lower end of one side of the wind guide cover 3 that is close to the waist hanging hook 11 abuts against a groove bottom of the annular groove 8. There is a clamping protrusion 32 on an outer wall of the contact section 31, a clamping groove is provided on a groove wall of the annular grove 8 that is close to the cloth hanging hook 12. The clamping groove is provided on a rotation path of the wind guide cover 3, and there are two clamping grooves, namely a vertical clamping groove 71 and an inclined clamping groove 72. The vertical clamping groove 71 is provided below the inclined clamping groove 72.

In an implementation mode, an arrangement of the annular groove 8 can also be such that a wall of the air outlet end of the upper inner wind duct shell 21 is not a two-layer structure, but a single-layer structure. There is a downward extending annular protrusion at the air outlet of the outer shell 1, the annular protrusion surrounds the wall of the air outlet end of the upper inner wind duct shell 21 to form the annular groove. At this time, the clamping groove can be provided on outer shell 1.

During use, when the user is working outdoors, the waist hanging fan is hung on the user's waistband, belt, or clothing. A switch is turned on, the fan is rotated to achieve the fan's air output. At this time, if the user wants to change the fan's air output angle, he can toggle the wind guide cover 3 to cause the wind guide cover 3 to rotate around the rotating shafts 33. During rotation, the clamping protrusion 32 will be engaged in the vertical clamping groove 71 or the inclined clamping groove 72. At this time, a blowing angle of the wind guide cover 3 is fixed and the fan blows air in a fixed direction.

What is claimed is:

1. A waist hanging fan, comprising an outer shell and a blowing component,
wherein the blowing component comprises:
an inner wind duct shell, which is provided in the outer shell, and two ends of the inner wind duct shell are provided with an air inlet end and an air outlet end that are connected to an outside;
an air blower, which is provided in the inner wind duct shell, and
a wind guide cover, which is provided at the air outlet end through two rotating shafts, a cross-sectional shape of a circumferential inner edge of the wind guide cover is circular, a lower end of the wind guide cover is provided in the outer shell and is sleeved on an outer side of the inner wind duct shell;

an outer wall of the lower end of the wind guide cover is provided with a clamping protrusion, and at least two clamping grooves are provided on a wall of the outer shell or inner wind duct shell;

the clamping grooves are arranged to be spaced apart on a rotation path of the wind guide cover, and the clamping protrusion is capable of matching one of the clamping grooves.

2. The waist hanging fan according to claim 1, wherein a limit position table-board is provided on an inner wall of the wind guide cover, and the limit position table-board abuts against an end face of the air outlet end so as to limit a limit position of a rotation of the wind guide cover.

3. The waist hanging fan according to claim 2, wherein hooks are provided on a side wall of the outer shell, and positions of the hooks on the outer shell are perpendicular to a connecting line of the two rotating shafts;

the limit position table-board comprises a first table-board that is close to the hooks and a second table-board that is away from the hooks, there is an angle between the first table-board and the second table-board;

when the first table-board abuts against an end face of the air outlet end, the wind guide cover is faced vertically;

when the second table-board abuts against an end face of the air outlet end, the wind guide cover is tilted towards the hooks.

4. The waist hanging fan according to claim 3, wherein the air outlet end of the inner wind duct shell is provided with an annular groove having an upward opening, the wind guide cover is adapted into the annular groove, one side of the wind guide cover that is away from the hooks is provided with a contact section that is extended downward;

when the wind guide cover is faced vertically, a lower end of the contact section abuts against a groove bottom of the annular groove;

when the wind guide cover is tilted towards the hooks, a lower end of one side of the wind guide cover that is close to the hooks abuts against the groove bottom of the annular groove.

5. The waist hanging fan according to claim 4, wherein an outer wall of the contact section is provided with the clamping protrusion.

6. The waist hanging fan according to claim 4, wherein a groove wall of the annular groove that is away from the hooks is provided with the clamping grooves, and there are two clamping grooves, namely, a vertical clamping groove and an inclined clamping groove, and the vertical clamping groove is provided below the inclined clamping groove.

7. The waist hanging fan according to claim 1, wherein two ends of the inner wind duct shell respectively comprise an upper inner wind duct shell and a lower inner wind duct shell, an inner diameter of the upper inner wind duct shell is gradually decreased from bottom to top, the lower inner wind duct shell comprises an air inlet section with the air inlet end and an air blower section with the air blower, the air inlet section is provided at a lower end of the air blower section, an inner diameter of the air inlet section is gradually decreased from bottom to top, an inner diameter of the air blower section is gradually increased from bottom to top.

8. The waist hanging fan according to claim 7, wherein the inner wind duct shell further comprises a middle inner wind duct shell provided between the upper inner wind duct shell and the lower inner wind duct shell, the middle inner wind duct shell is annular, and upper and lower ends of the middle inner wind duct shell are respectively connected to the upper inner wind duct shell and the lower inner wind duct shell, a fixing frame configured to fix the air blower is provided in the middle inner wind duct shell.

9. The waist hanging fan according to claim 3, wherein the hooks comprise a waist hanging hook and a cloth hanging hook that are arranged on two opposite sides of the outer shell, hanging directions of the waist hanging hook and cloth hanging hook are opposite, the wind guide cover is tilted towards the waist hanging hook and is not tilted towards the cloth hanging hook.

10. The waist hanging fan according to claim 1, wherein the hooks are provided with support feet, and the support feet are rotatably connected to the hooks.

* * * * *